UNITED STATES PATENT OFFICE.

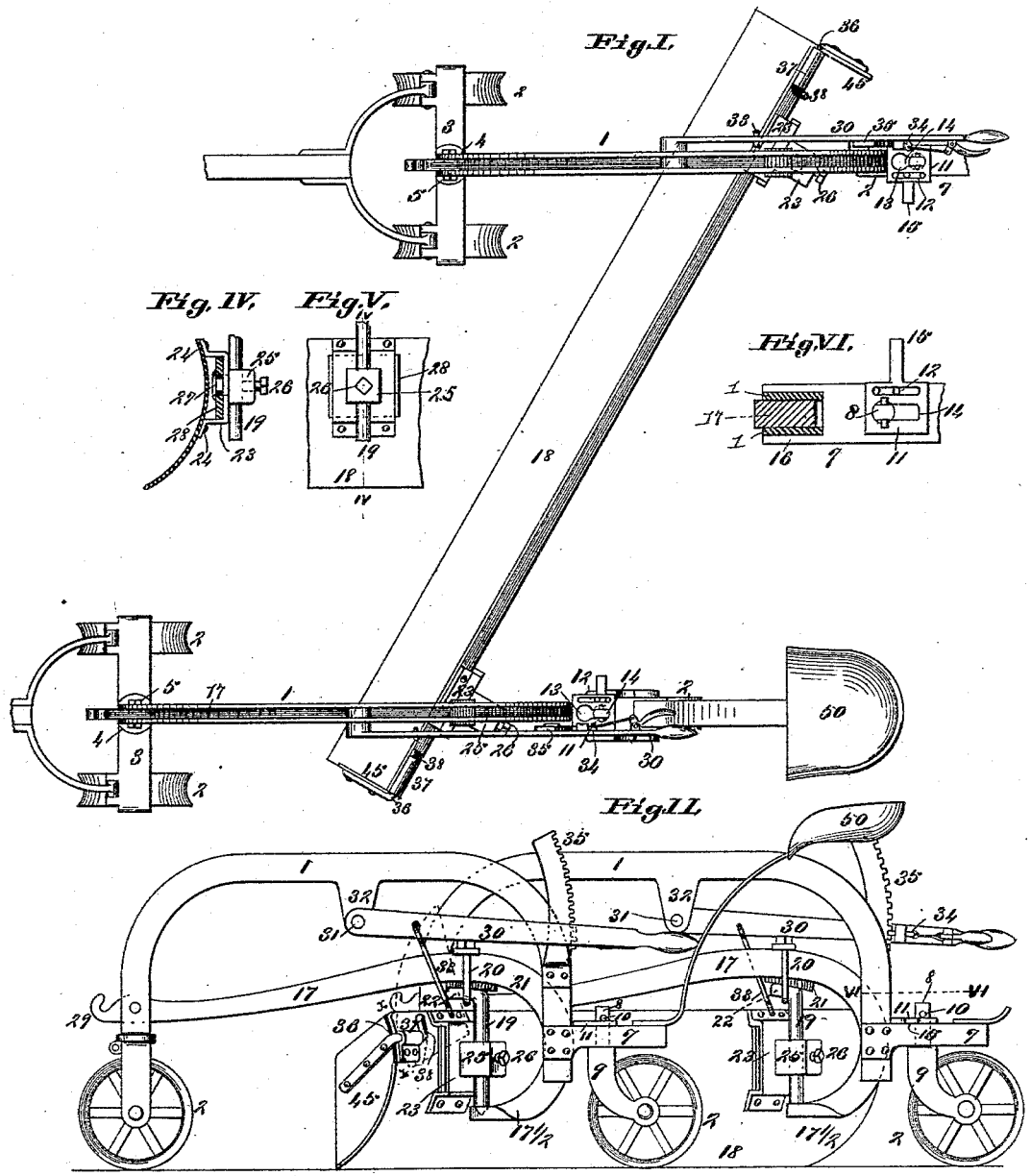

JOHN C. GORDON, OF MONMOUTH, ILLINOIS.

ROAD SCRAPER AND GRADER.

SPECIFICATION forming part of Letters Patent No. 414,522, dated November 5, 1889.

Application filed September 26, 1888. Serial No. 286,427. (No model.)

*To all whom it may concern:*

Be it known that I, JOHN C. GORDON, of Monmouth, in the county of Warren and State of Illinois, have invented a certain new and useful Improvement in Road Scrapers and Graders, of which the following is a full, clear, and exact description, reference being had to the accompanying drawings, forming part of this specification, and in which—

Figure I is a top or plan view of my improved scraper and grader. Fig. II is an elevation. Fig. III is a view of one of the trucks. Fig. IV is a section taken on line IV IV, Fig. V. Fig. V is a detail view showing the connection between the shovel and its supporting-shafts. Fig. VI is an enlarged section taken on line VI VI, Fig. II.

My invention relates to certain new and useful improvements in scrapers and graders intended more particularly for use in making roads and streets, but which may be used for other purposes. It is adjustable to suit the various conditions of works that it may be used for.

My invention consists in features of novelty hereinafter fully described, and pointed out in the claims.

Referring to the drawings, 1 represents frames or arches mounted on ground-wheels 2. The front ground-wheels are preferably used in pairs, forming a truck, as shown in Fig. III, the cross bar or frame 3 of the truck having a slotted neck 4 to receive the arch, to which it is connected by a pin 5. The frame 3 has a pivotal connection with the neck 4, as shown at 6, so that the truck can turn irrespective of the arch. There are two arches 1, each provided with the front and rear wheels 2. The rear wheels are preferably journaled in extensions 7, secured to the arches. (See Fig. II.) These rear wheels are simply held in the extensions 7 by the necks 8 of their yokes 9, passing through perforations in the extensions and held therein by transverse pins 10. They are thus allowed to turn freely laterally while the machine is at work, and by thus making both the front and rear wheels so that they may turn laterally as well as revolve the machine can be turned around in a small space. In going a long distance without turning the rear wheels may be held, if desired, from turning laterally by a sliding plate 11, having slot-and-pin connection 12 with the extensions 7, (see Fig. VI,) each plate having a round hole or perforation 13 to receive the non-circular neck 8 when the wheel is to turn laterally and a slot 14 to receive the neck when the wheel is to be held from turning laterally. When the plate is in the position shown in Fig. VI, the wheel can turn laterally, and by simply sliding the plate forward (for which purpose it may be provided with a handle or lever 15) the wheel will be held from thus turning. The extensions 7 are bifurcated or forked at their inner ends, as shown at 16, Fig. VI, to receive the arches 1, each arch being preferably formed of two bent bars placed parallel, as shown in Fig. I.

17 represents draft-beams, to which the shovel 18 is secured. The connection between the shovel and draft-beams consists, preferably, of rods or shafts 19, connected to the beams by clips 20, which are adjustable on the beams, and I prefer to place tightening-wedges 21 between the heads 22 of the rods 19 and the beams 17, as shown in Fig. II. The rods 19 are secured to the shovel by means of brackets 23, bolted or riveted to the shovel, as shown at 24, Fig. IV, and blocks 25, which are perforated to receive the rods 19, and in which the rods are held by set-screws 26. The blocks 25 are provided with necks 27, which extend through the brackets 23, and within the brackets are plates 28, to which the necks are riveted, as shown in Fig. IV. The plates are not riveted to the necks of the blocks so tightly but that the blocks can turn to allow the shovel to yield slightly. The set-screw connection 26 between the blocks 25 and rods 19 permits of a vertically-adjustable connection of the shovel, so that either end of the shovel may be raised or lowered at will. The lower ends of the rods 19 are stepped into the lower inturned ends 17½ of the beams 17, (see Fig. II,) so that the rods or shafts 19 have both an upper and lower bearing or support. The draft-beams 17 are provided with hooks 29 at their forward ends for the attachment of the draft-animals.

30 represents levers pivoted at 31 to extensions 32 of the arches 1. These levers are connected by bars or heavy rods 33 to the shovel 18, and they are provided with pawls 34, engaging racks 35. By raising or lowering on the free ends of these levers it will be seen that the shovel will be raised or lowered at will, and either end may be raised or lowered independently of the other.

45 represents wings secured to the ends of the shovel, as shown in Fig. II. They may be turned down, as shown in full lines, Fig. II, when the machine is being used as a scraper, and may be turned up, as shown by dotted lines in Fig. II, when the machine is being used as a grader. One of these wings is shown turned down on the left-hand side of Fig. I, and the other is shown turned up on the right-hand side of Fig. I. The wings are connected to the body of the shovel by rods 36, journaled in boxes 37. The inner ends of the rods are turned, as shown at 38, to form cranks by which the wings may be turned, and these ends bear against the shovel, as shown by dotted lines in Fig. II, when the wings are turned to their upper position, and thus form a support, preventing the wings from making a complete revolution and holding them in their upper position.

As the wings fit within the shovel 18, as shown on the left in Figs. I and II, it is necessary in order that the wings may rotate into the position shown in dotted lines, Fig. II, to cut away a portion of the shovel between the points $x\,x$, so as to allow the upper portion of the wing to pass the end or edge of the shovel in the act of rotating.

50 represents the driver's seat.

The wheels 2 are preferably formed with grooved ends, as shown in Figs. I and III, to prevent the lateral slipping of the machine under strain when in use.

It will be understood that the draft-animals are attached to each end of the machine, and that by driving one of them ahead of the other the proper incline will be given to the shovel.

I claim as my invention—

1. In a scraper and grader, the combination of the independent arches, beams secured to the arches, supporting-wheels, and a shovel adjustably secured to the beams, substantially as and for the purpose set forth.

2. In a scraper and grader, the combination of the independent arches, beams secured to the arches, supporting-wheels, and a shovel secured to the beams by means of rods and blocks, the rods being adjustable within the blocks and the blocks being capable of turning in their bearings, substantially as and for the purpose set forth.

3. In a scraper and grader, the combination of the arches, beams secured to the arches, supporting-wheels, and a shovel secured to the beams by clips 20, wedges 21, blocks 25, brackets 23, and plates 28, substantially as and for the purpose set forth.

4. In a scraper and grader, the combination of the independent arches, beams secured to the arches, a shovel secured to the beams, and grooved supporting-wheels, substantially as and for the purpose set forth.

5. In a scraper and grader, the combination of the arches, beams secured to the arches, a shovel secured to the beams, and front and rear supporting-wheels, the rear supporting-wheels having yokes 9, and a sliding plate 11, with perforation 13, slot 14, and handles 15, substantially as set forth.

6. In a road scraper and grader, the combination of supporting mechanism, a shovel provided with changeable wings 45, and the crank-rods 36, by which said wings are pivoted to the shovel and by which the wings may be held in either an operative or inoperative position, substantially as set forth.

7. In a scraper and grader, the combination of the independent arches, beams secured to the arches, an adjustable scraper secured to the beams, levers 30, racks 35, and connecting rods or bars 33, substantially as and for the purpose set forth.

8. In a scraper and grader, the combination of the supporting mechanism and a shovel provided with changeable wings secured to the scraper by boxes 37 and rods 36, the rods having cranks 38, substantially as set forth.

JOHN C. GORDON.

Witnesses:
ALEX. BETTES,
J. W. FULTON.